United States Patent Office 3,172,105
Patented Mar. 2, 1965

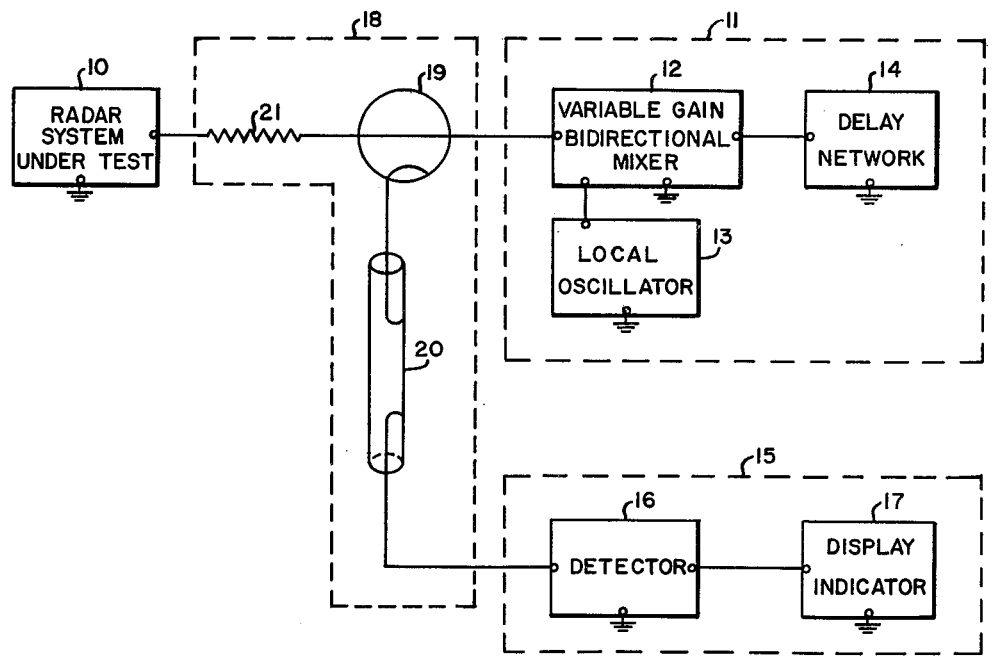

3,172,105
RADAR TESTER
Carl E. Schwab, Farmingdale, N.Y., assignor to
Hazeltine Research, Inc., a corporation of Illinois
Filed June 23, 1960, Ser. No. 38,254
5 Claims. (Cl. 343—17.7)

General

This invention relates to a testing unit for measuring the over-all performance of a radar system.

In general, there are two techniques presently used for measuring the performance of a radar system. In the first technique, a signal of known amplitude is supplied to the radar system under test to determine whether or not the receiving circuits will respond thereto. Such a technique, while providing an indication of the minimum signal to which the receiving circuits will respond, does not, however, measure the over-all performance of the system since no measurements are made of the transmitting characteristics. In the second technique, a transmitted signal from the radar system under test is supplied to a delay network, and a delayed reproduction, which simulates a target return signal, is supplied to the receiving circuits of the system. Separate measurements of the transmitted and return signals are then taken by a power measuring device such as a thermistor bridge. These measurements provide absolute power data used in determining the over-all peformance of the system. This latter technique, however, can prove very inaccurate for a number of reasons. First, if two separate power measuring devices are used, one for measuring the transmitted signal and one for measuring the target return signal, the two standards are very likely to be different. If, on the other hand, the same power measuring device is used, the measurements cannot be taken at the same time, and certain conditions which may be present during the time that one measurement is being taken might not be present during the time that the other measurement is being taken.

It is an object of the present invention to provide a new and improved testing unit for measuring the over-all performance of a radar system.

It is another object of the present invention to provide a new and improved testing unit for accurately measuring the over-all performance of a radar system by using a single standard which provides data of both the transmitted and return signals simultaneously.

In accordance with a particular form of the present invention, a testing unit for measuring the over-all performance of a radar system comprises means responsive to a transmitted signal from the system for developing a delayed reproduction thereof which is supplied to the receiving circuits of the system to simulate a target return signal. The invention also includes means for indicating the amplitudes of the transmitted and return signals and means for individually adjusting the amplitudes of the transmitted and return signals to a prescribed level on the last-mentioned means, the settings of the adjustments providing a measure of the relative amplitudes of the transmitted and return signals.

For a better understanding of the present invention, together with other and further objects thereof, reference is had to the following description, taken in connection with the accompanying drawing, and its scope will be pointed out in the appended claims.

Referring to the drawing, there is shown a testing unit for measuring the over-all performance of a radar system constructed in accordance with the present invention.

Description of the testing unit

Referring to the drawing, a testing unit for measuring the over-all performance of a radar system 10, constructed in accordance with the present invention, comprises means 11 responsive to a transmitted signal from the radar system for developing a delayed reproduction thereof which is supplied to the receiving circuits of the radar system to simulate a target return signal. Means 11 may include a variable gain bidirectional mixer 12, a local oscillator 13, and a delay network 14, all of conventional construction. The invention also includes means 15 for indicating the amplitudes of the transmitted and return signals. Means 15 may include a conventional amplitude detector 16 and a display indicator 17, such as a cathode-ray tube. The invention further includes means 18 for individually adjusting the amplitudes of the transmitted and return signals to a prescribed level on means 15, the settings of the adjustments providing a measure of the relative amplitudes of the transmitted and return signals. Means 18 may include a reactive coupler 19 and a piston attenuator 20, both of conventional construction. Means 18 may additionally include an attenuator pad 21 connected between the radar system 10 and the reactive coupler 19.

Operation of the testing unit

The radar system 10 under test supplies a transmitted signal to the testing unit constructed in accordance with the present invention. Initially, it will be assumed that pad 21 has been omitted from means 18. Means 11, responsive to the transmitted signal from the radar system 10, develops a delayed reproduction of the transmitted signal which is supplied back to the receiving circuits of the radar system to simulate a target return signal. In particular, the transmitted signal is supplied through the reactive coupler 19 to the variable gain bidirectional mixer 12. The local oscillator 13, connected to the mixer 12, causes the transmitted radio-frequency signal to be beat down to an intermediate-frequency signal in the conventional manner. The intermediate-frequency signal is, in turn, supplied to the delay network 14, whereat a delayed reproduction of the intermediate-frequency signal is developed, the delay time simulating the round trip travel time of an actual transmitted signal. The delayed intermediate-frequency signal is returned to the mixer 12, whereat the signal is beat back up, again in a conventional manner, to a radio-frequency signal which simulates a target return signal. The target return signal is supplied through the reactive coupler 19 to the receiving circuits of the radar system 10. Due to the fact that the mixer 12 has a variable gain, it is possible to control the amplitude of the target return signal. Different amplitudes of the target return signal correspond to different size targets. Ordinarily, the amplitude of the target return signal is adjusted to the smallest amplitude to which the receiving circuits of the radar system 10 will respond.

Both the transmitted and return signals are coupled through the reactive coupler 19 and the piston attenuator 20 to means 15. Detector 16 detects the two radio-frequency signals in a conventional manner, and the detected signals, in turn, are supplied to the display indicator 17. Since the transmitted and return signals are displaced in time due to the delay introduced by the delay network 14, both signals can be viewed simultaneously on the display indicator 17. Normally, the target return signal is of smaller amplitude than the transmitted signal.

The piston attenuator is now used first to adjust the amplitude of the transmitted signal to a prescribed level on the display indicator 17, and the reading of the setting of the piston attenuator is noted. Next, the piston attenuator is used to adjust the amplitude of the target return signal to the same prescribed level on the display indicator 17, and the reading of this setting of the piston attenuator is also noted. The settings of the adjustments of the piston attenuator provide an accurate measure of the relative amplitudes of the transmitted and return signals. Furthermore, if the transmitting circuits of the radar system 10 are adjusted to provide the maximum transmitted signal, and the gain of the mixer 12 is adjusted to supply a target return signal having the minimum amplitude to which the receiving circuits will respond, the settings of the piston attenuator provide very accurate measures of the ratio of transmitted and return signals as they pass through the reactive coupler 19, and this ratio in decibels will provide an accurate measure of the over-all performance of the radar system and its maximum sensitivity.

For a system having high sensitivity, difficulty may be encountered in the detector circuit 16. More particularly, where the amplitude of the transmitted signal is much larger than the amplitude of the target return signal, the recovery time of the detector 16 may prevent the detection of the small-amplitude target return signal after the large-amplitude transmitted signal has been detected. Therefore, as a practical matter, the pad 21 should be included within means 18 for high-sensitivity systems. The purpose of this pad is to attenuate the transmitted signal from the radar system 10 by a fixed amount to a satisfactory level. Since the target return signal is also attenuated before it is applied to the receiving circuits of the radar system, the signal developed by means 11 must be larger than the minimum signal to which the receiving circuits will respond since the attenuation of the pad 21 must be compensated for. The net result, it will be seen, is a decrease in amplitude of the transmitted signal which is viewed on the display indicator 17 and an increase in amplitude of the target return signal which is viewed on the display indicator. Furthermore, the difference in amplitudes of the two signals supplied to the detector 16 is not so great, even though the amplitude of the actual signal transmitted by the system is much greater than the target return signal supplied to the receiving circuits of the system. When the pad 21 is included in means 18, the ratio of the settings of the piston attenuator in decibels is added to two times the attenuation ratio in decibels (fixed value of attenuation) of the pad 21 to provide an accurate measure of the over-all performance of the radar system and its maximum sensitivity. By utilizing a calibrated pad 21 at an appropriate attenuation value, this value being determined by the sensitivity of the system under test, the difference in signal levels measured by the piston attenuator 20 can be quite small, and any overall error caused by the piston attenuator is reduced proportionately.

While there has been described what is at present considered to be the preferred embodiment of the invention, it will be obvious to those skilled in the art that various changes and modifications may be made therein without departing from the invention, and it is, therefore, aimed to cover all such changes and modifications as fall within the true spirit and scope of the invention.

What is claimed is:

1. A testing unit for measuring the over-all performance of a radar system comprising: means responsive to a transmitted signal from said system for developing a delayed reproduction thereof which is supplied to the receiving circuits of said system to simulate a target return signal; means for indicating the amplitudes of said transmitted and return signals; and means for individually adjusting the amplitudes of said transmitted and return signals to a prescribed level on said last-mentioned means, the settings of the adjustments providing a measure of the relative amplitudes of said transmitted and return signals.

2. A testing unit for measuring the over-all performance of a radar system comprising: means responsive to a transmitted signal from said system for developing a delayed reproduction thereof which is supplied to the receiving circuits of said system to simulate a target return signal and has the smallest amplitude to which said receiving circuits will respond; means for indicating the amplitudes of said transmitted and return signals; and means for individually adjusting the amplitudes of said transmitted and return signals to a prescribed level on said last-mentioned means, the settings of the adjustments providing a measure of the relative amplitudes of said transmitted and return signals.

3. A testing unit for measuring the over-all performance of a radar system comprising: means responsive to a transmitted signal from said system for developing a delayed reproduction thereof which is supplied to the receiving circuits of said system to simulate a target return signal and has the smallest amplitude to which said receiving circuits will respond; means for indicating the amplitudes of said transmitted and return signals; and means first for adjusting the amplitude of said transmitted signal to a prescribed level on said last-mentioned means and second for adjusting the amplitude of said return signal to said prescribed level, the settings of the adjustments providing a measure of the relative amplitudes of said transmitted and return signals.

4. A testing unit for measuring the over-all performance of a radar system comprising: means responsive to a transmitted signal from said system for developing a delayed reproduction thereof which is supplied to the receiving circuits of said system to simulate a target return signal; means for indicating the amplitudes of said transmitted and return signals; and a piston attenuator for individually adjusting the amplitudes of said transmitted and return signals to a prescribed level on said last-mentioned means, the settings of the adjustments providing a measure of the relative amplitudes of said transmitted and return signals.

5. A testing unit for measuring the over-all performance of a radar system comprising: means responsive to a transmitted signal from said system for developing a delayed reproduction thereof which is supplied to the receiving circuits of said system to simulate a target return signal and has the smallest amplitude to which said receiving circuits will respond; means for indicating the amplitudes of said transmitted and return signals; and a piston attenuator first for adjusting the amplitude of said transmitted signal to a prescribed level on said last-mentioned means and second for adjusting the amplitude of said return signal to said prescribed level, the settings of the adjustments providing a measure of the relative amplitudes of said transmitted and return signals.

References Cited in the file of this patent

UNITED STATES PATENTS

| | | |
|---|---|---|
| 2,516,060 | Levenson | July 18, 1950 |
| 2,549,385 | Rapuano | Apr. 17, 1951 |
| 2,619,634 | Isely | Nov. 25, 1952 |
| 2,681,986 | Wolf | June 22, 1954 |
| 2,763,858 | Fairbank | Sept. 18, 1956 |
| 2,775,759 | Okrent | Dec. 25, 1956 |